United States Patent [19]

Mattori

[11] 4,208,664

[45] Jun. 17, 1980

[54] TAXI DRIVE CONDITION RECORDER SYSTEM

[75] Inventor: Hiroaki Mattori, Yamatokoriyama, Japan

[73] Assignee: Sharp Kabushiki Kaisha, Osaka, Japan

[21] Appl. No.: 897,543

[22] Filed: Apr. 18, 1978

[30] Foreign Application Priority Data

Apr. 22, 1977 [JP] Japan .................................. 52/47035

[51] Int. Cl.[2] .......................... G01D 9/00; G01D 9/28

[52] U.S. Cl. ........................................ 346/15; 346/40; 346/60

[58] Field of Search ................. 346/15, 33 R, 33 MC, 346/40, 59, 60

[56] References Cited

U.S. PATENT DOCUMENTS

| | | | |
|---|---|---|---|
| 510,814 | 12/1893 | Norren | 346/40 |
| 610,972 | 9/1898 | Powell | 346/40 |
| 630,272 | 8/1899 | Swenson | 346/40 |
| 1,525,856 | 2/1925 | Ehrlich | 346/15 X |
| 2,289,750 | 7/1942 | Branham | 346/59 X |
| 3,742,514 | 6/1973 | Sugimura | 346/33 R |

*Primary Examiner*—George H. Miller, Jr.
*Attorney, Agent, or Firm*—Birch, Stewart, Kolasch & Birch

[57] ABSTRACT

A printer system is associated with a taximeter for calculating the taxi fare, a seat switch for detecting a passenger who occupies the taxi, and a timepiece. A printer driver functions to drive the printer to record a drive condition of a taxi and time information each time when the drive condition is changed, for example, from "for hire" wherein the taxi is not occupied by the passenger and no fare is computed to "occupied" wherein the taxi is occupied by the passenger and the taxi fare is computed through the use of a predetermined tariff.

11 Claims, 8 Drawing Figures

| BF | | CC | | | | |
|---|---|---|---|---|---|---|
| 0 | 0 | 0 | 0 | 0 | 1 | (1) |
| 0 | 1 | 0 | 0 | 1 | 0 | (2) |
| 1 | 0 | 0 | 0 | 1 | 1 | (3) |
| 1 | 1 | 0 | 1 | 0 | 0 | (4) |
FIG. 5
| | | |
|---|---|---|
| 01 | 1 | 07.53 |
| 02 | 4 | 08.02 |
| 03 | 1 | 08.13 |
| 04 | 2 | 08.27 |
| 05 | 1 | 08.45 |
| 06 | 4 | 08.01 |
| 07 | 1 | 09.18 |
FIG. 6
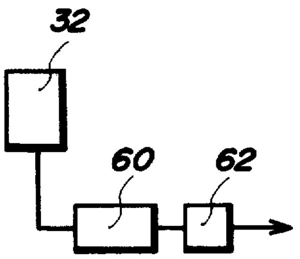
FIG. 7
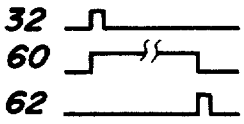
FIG. 8

TAXI DRIVE CONDITION RECORDER SYSTEM

BACKGROUND AND SUMMARY OF THE INVENTION

The present invention relates to a recorder system for recording the drive condition of a taxi.

The present invention relates, more particularly, to a printer system for recording a drive condition of a taxi and time information each time when the drive condition is changed from a specific mode to another.

More specifically, the present system detects and records the drive condition of the taxi in order to detect or prevent an erroneous operation or an abnormal operation of a taximeter.

Accordingly, an object of the present invention is to provide a printer system for recording the drive condition of a taxi.

Another object of the present invention is to provide a printer system associated with a taximeter, a seat switch and a timepiece.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The printer system is associated with a taximeter for calculating the taxi fare, a timepiece, and a seat switch for detecting a passenger who occupies the taxi. The printer system records a drive condition and time information each time when the drive condition is changed.

The drive condition is mainly classified into the following four conditions.

(1) The taximeter is placed in the condition where no fare is calculated and the seat switch says that the taxi is not occupied by any passengers.

NORMAL/FOR HIRE (2) The taximeter is placed in the condition where no fare is calculated and the seat switch says that the taxi is occupied by one or more passengers.

ABNORMAL OR ERRONEOUS OPERATION (3) The taximeter is placed in the condition where a time charge is calculated or a mileage fare is calculated and the seat switch says that the taxi is not occupied by any passengers.

NORMAL/WAITING OR NORMAL/FOR MEETING AND RECEIVING (4) The taximeter is placed in the condition where the fare is calculated through the use of a specific tariff and the seat switch says that the taxi is occupied by one or more passengers.

NORMAL/OCCUPIED

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 5 is a chart showing relationships between contents of a buffer register and outputs of a code converter;

FIG. 6 is a chart of an example of an actual printing conducted by the printer system of the present invention;

FIG. 7 is a block diagram of a portion of a modified control circuit of FIG. 4; and FIG. 8 is a time chart for explaining operation of the control circuit of FIG. 7.

DESCRIPTION OF THE PREFERRED EMBODIMENTS

Figure 1:
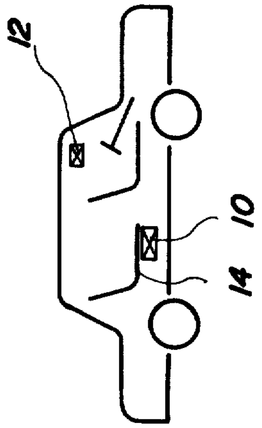
FIG. 1 is a schematic sectional view of a taxi employing a printer system of the present invention.

FIG. 1 schematically shows a taxi, which mainly comprises a seat switch 10 and a taximeter 12. The seat switch 10 is positioned below rear seats 14 of the taxi in order to detect whether passengers are in the taxi or not. More specifically, the seat switch 10 is ON when one or more passengers sit in the rear seats 14. The taximeter 12 is placed into a desired operation mode by a taxi driver.

Figure 2:
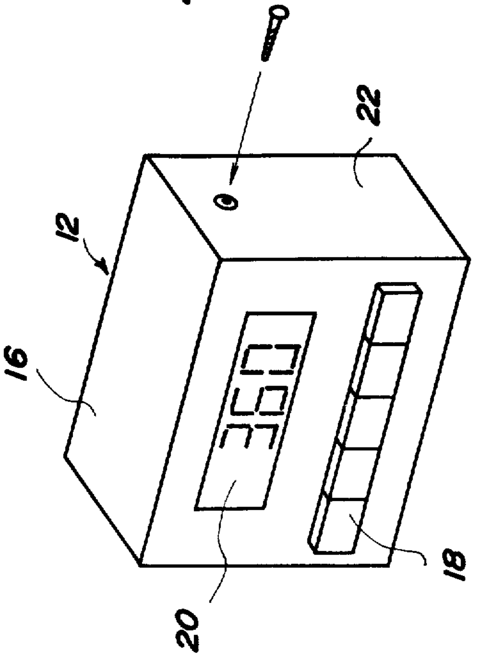
FIG. 2 is a perspective view of a taximeter employing an embodiment of a printer system of the present invention.
Figure 3:
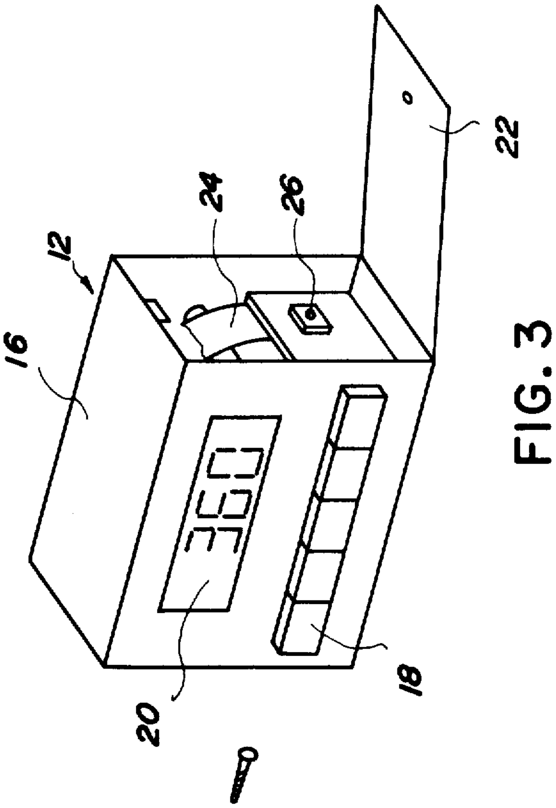
FIG. 3 is a perspective view of the taximeter of FIG. 2, wherein a door is opened.

FIGS. 2 and 3 show the taximeter 12. The taximeter 12 mainly comprises a casing 16, a keyboard unit 18 for controlling the operation mode of the taximeter 12, and a digital display 20 for indicating a taxi fare calculated by the taximeter 12. The keyboard unit 18 includes five switches only one of which is placed in the locked condition at any one time by manual depression, and which is released from the locked condition when another switch is depressed by the taxi driver. The respective switches determine the operation mode of the taximeter, for example, "for hire mode" wherein no fare is computed, "mileage fare mode", "time charge mode" wherein the time charge is calculated for the waiting period of time, and "extra mode" for selecting an extra tariff.

The casing 16 includes a door 22 which can be opened through the use of a key preferably kept by a manager. A printer 24 is disposed within the casing 16 for recording the drive condition of the taxi. A master switch 26 is installed within the casing 16. The master switch 26 is depressed when the taxi starts the daily work, whereby the taximeter 12 is placed in the operative condition.

Figure 4:
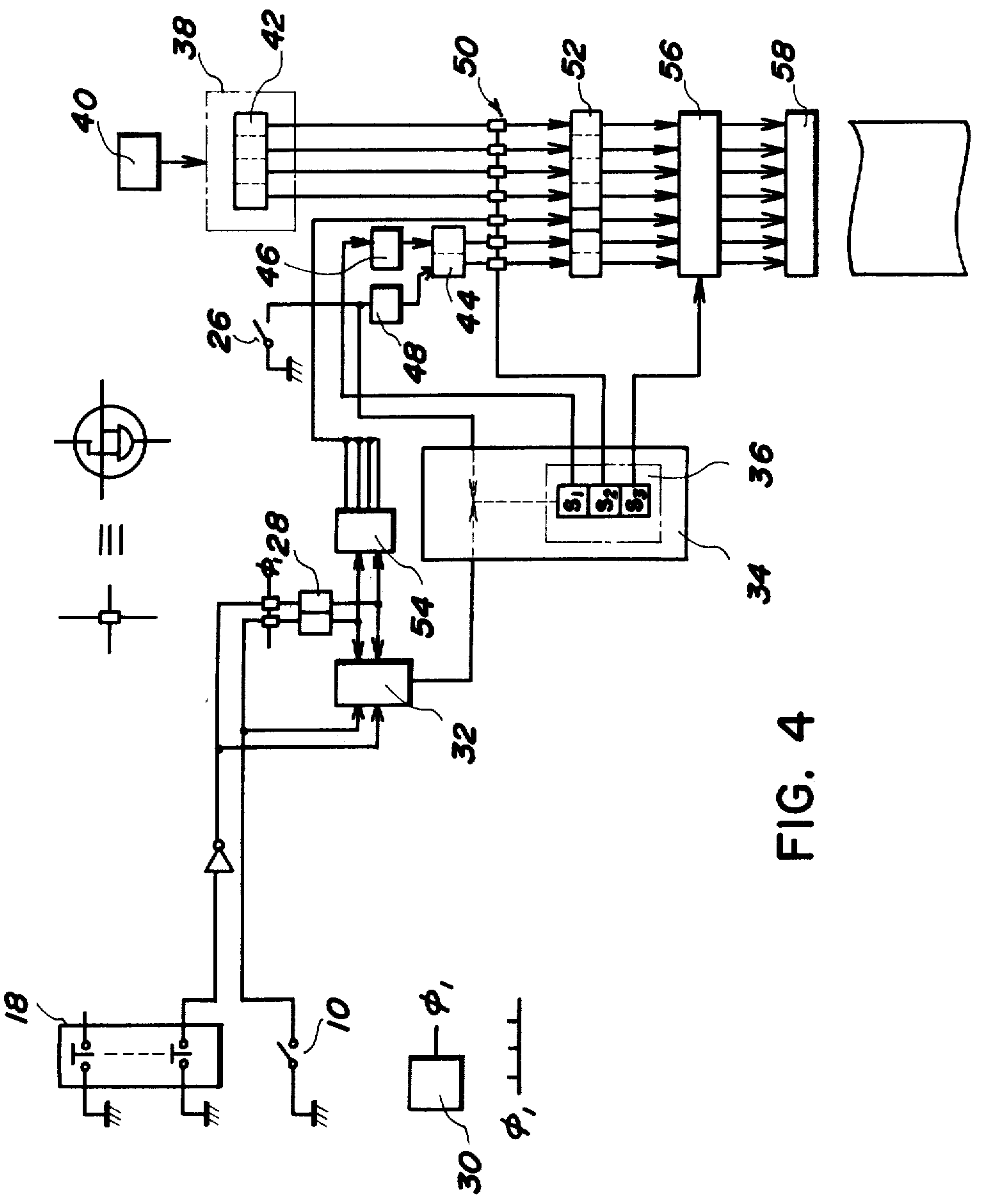
FIG. 4 is a block diagram of a control circuit of an embodiment of a printer system of the present invention.

FIG. 4 shows a control circuit of a printer system of the present invention.

Operation mode determination signals derived from the keyboard unit 18 and a passenger detection signal derived form the seat switch 10 are introduced into a buffer register 28 in response to a clock signal $\phi_1$ derived from a clock pulse generator 30. The thus introduced operation mode determination signals and the passenger detection signal are stored in the buffer register 28 till the following clock signal $\phi_1$ is developed. The contents stored in the buffer register 28 are applied to a comparator 32 which also receives the operation mode determination signals from the keyboard unit 18 and the passenger detection signal from the seat switch 10. The comparator 32 develops a control signal when the condition of the seat switch 10 or the keyboard unit 18 is changed.

A central control unit 34 of the taximeter 12 includes a sequential circuit 36 comprising printer control sequential signal generation circuits $S_1$, $S_2$ and $S_3$, which are sequentially activated when the control signal is developed from the comparator 32.

A timepiece 38 includes a frequency divider connected to a quartz oscillator 40, and a register 42 for storing current time information. A counter 44 is connected to receive an increment signal derived from a counter control 46, which develops the increment signal in response to a control signal derived from the printer control sequential signal generation circuit $S_1$. Accordingly, the contents of the counter 44 are increased by one upon every change of the condition of the seat switch 10 or the keyboard unit 18. The contents of the counter 44 are cleared to zero when a clear signal is developed from a clear circuit 48. The clear circuit 48 develops the clear signal when the master switch 26 is depressed. When the master switch 26 is depressed, the counter 44 is cleared to zero by the clear circuit 48, and the sequential circuit 36 is activated. The printer control sequential signal generation circuit $S_1$ develops a control signal to be applied to the counter control 46, whereby the contents of the counter 44 are set to 01. The following printer control sequential signal generation circuit $S_2$ develops a control signal to turn on gate circuits 50.

When the gate circuits 50 are ON by the control signal derived from the printer control sequential signal generation circuit $S_2$, a buffer register 52 is connected to receive the contents stored in the counter 44, the contents stored in the buffer register 28 through a code converter 54, and the current time information stored in the register 42 of the timepiece 38. Thereafter, a control signal is developed from the printer control sequential signal generation circuit $S_3$ to activate a printer driver 56, thereby printing the information stored in the buffer register 52 through the use of a printer 58.

The printer 58 can be made of a conventional discharge type printer. In the circuit of FIG. 4, the lower bit of the buffer register 28 is connected to the keyboard unit 18 so that the lower bit of the buffer register 28 is "1" when the taximeter 12 is placed in any one of the modes which calculate the fare. FIG. 5 shows the relationships between the contents stored in the buffer register 28 and the outputs of the code converter 54.

FIG. 6 shows an example of the actual print out of the printer 58.

The left column indicates the serial number of the print output which is derived from the counter 44. The middle column indicates the drive condition of the taxi which corresponds to the output signal of the code converter 54. The right column indicates the time information stored in the register 42.

Now assume that the master switch 26 is depressed at seven fifty-three. The first row shows the above fact. That is, 01 1 07.53. Thereafter, when a passenger rides in the taxi at eight two, the printing is conducted to the second row in the form of 02 4 08.02 in case where the taximeter 12 is placed in the mode which calculates the fare and the seat switch 10 is ON.

More specifically, when the passenger sits in the rear seat, the seat switch 10 becomes ON. And, when the taxi driver selects the mileage fare calculation mode through the use of the keyboard unit 18, the lower bit of the buffer register 28 receives a signal of logic "1". That is, the contents of the buffer register 28 become "11". Therefore, the code converter 54 develops a signal corresponding to a numeral four (4) (0100).

Change of the contents of the buffer register 28 is detected by the comparator 32, which develops a control signal to activate the sequential circuit 36. By the control signal derived from the printer control sequential signal generation circuit $S_1$, the contents of the counter 44 are changed to "02". By the following control signal derived from the printer control sequential signal generation circuit $S_2$, the information stored in the counter 44, the code converter 54 and the register 42 of the timepiece 38 is introduced into the buffer register 52. The thus introduced information is "02 4 08.02". Thereafter, the information stored in the buffer register 52 is printed out by the following control signal derived from the printer control sequential signal generation circuit $S_3$.

In the actual system, the detection by the seat switch 10 and the selection operation conducted through the keyboard unit 18 will not occur at a same time. FIG. 7 shows a circuit construction which prevents an erroneous operation caused by the above-mentioned time difference.

A timer circuit 60 comprising a multivibrator is connected to receive a detection output from the comparator 32. The timer circuit 60 develops a signal of a pulsewidth about 30 seconds. A delayed control signal generator 62 is connected to the timer circuit 60 so that a delayed control signal is developed from the delayed control signal generator 62 at a trailing edge of the signal derived from the timer circuit 60. Therefore, the delayed control signal generator 62 develops one delayed control signal, which is applied to the sequential circuit 36, even when the contents stored in the buffer register 28 are changed more than twice within 30 seconds.

The invention being thus described, it will be obvious that the same may be varied in many ways. Such variations are not to be regarded as a departure from the spirit and scope of the invention, and all such modificatons are intended to be included within the scope of the following claims.

What is claimed is:

1. A recorder system for a taximeter said taximeter used in a taxi for transporting passengers, said recording system comprising:

a detection means for developing a control signal when an operational mode of said taxi as indicated on said taximeter is changed, said detection means including switch means installed within said taxi and actuated in response to the introduction of said passengers into said taxi for indicating the presence of one or more passengers in said taxi and operational mode indication means installed within said taximeter and actuated by the driver of said taxi for indicating a change in said operational mode of said taxi, said control signal being developed when either said switch means or said operational mode indication means is actuated; and a recorder apparatus for recording the operational mode of the taximeter in response to said control signal.

2. A recorder system in accordance with claim 1 wherein said recorder apparatus indicates an abnormal/erroneous operational mode of said taxi when said operational mode indication means installed within said taximeter indicates that no fare is being calculated and said switch means indicates said passengers are occupying said taxi.

3. A recorder system in accordance with claim 1 wherein said recorder apparatus indicates a normal/-waiting operational mode of said taxi or a normal/for meeting and receiving operational mode when said operational mode indication means indicates that a fare is being calculated and said switch means indicates that said passengers are not occupying said taxi.

4. A recorder system in accordance with claim 3 wherein said recorder apparatus indicates an abnormal/erroneous operational mode of said taxi when said operational mode indication means installed within said taximeter indicates that no fare is being calculated and said switch means indicates that said passengers are occupying said taxi.

5. A recorder system for a taximeter comprising:

a taximeter means for calculating a taxi fare in a selected operational mode;

detection means for detecting whether one or more passengers are in a taxi;

determination means responsive to said taximeter means and said detection means for developing a control signal when the operation mode of said taximeter means is changed or when a detection output of said detection means is changed;

a recorder apparatus; and a recorder control for recording said selected operation mode through the use of said recorder apparatus when said control signal is developed from said determination means.

6. The recorder system of claim 5, which further comprises a timepiece, wherein said recorder control also functions to record time information when said control signal is developed.

7. A recorder system in accordance with claims 5 or 6 wherein said recorder control indicates an abnormal/-erroneous operational mode of said taxi when said taximeter indicates that no fare is being calculated and said detector means indicates said passengers are occupying said taxi.

8. A recorder system in accordance with claims 5 or 6 wherein said recorder control indicates a normal/-waiting operational mode of said taxi or a normal/for meeting and receiving operational mode when said taximeter indicates that a fare is being calculated and said detection means indicates that said passengers are not occupying said taxi.

9. A recorder system in accordance with claims 5 or 6 wherein said recorder control indicates an abnormal/-erroneous operational mode of said taxi when said taximeter indicates that no fare is being calculated and said detection means indicates that said passengers are occupying said taxi; and said recorder control indicates a normal/waiting operational mode of said taxi or a normal/for meeting and receiving operational mode when said taximeter indicates that a fare is being calculated and said detection means indicates that said passengers are not occupying said taxi.

10. The recorder system of claim 5 or 6, wherein said recorder apparatus is a printer.

11. The recorder system of claim 10, wherein said detection means comprises a seat switch positioned below a rear seat of the taxi.

* * * * *